US007117289B2

(12) United States Patent
George

(10) Patent No.: US 7,117,289 B2
(45) Date of Patent: Oct. 3, 2006

(54) CLAIMING CYCLES ON A PROCESSOR BUS IN A SYSTEM HAVING A PCI TO PCI BRIDGE NORTH OF A MEMORY CONTROLLER

(75) Inventor: Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 10/262,204

(22) Filed: Sep. 30, 2002

(65) Prior Publication Data
US 2004/0064602 A1  Apr. 1, 2004

(51) Int. Cl.
G06F 13/36 (2006.01)
(52) U.S. Cl. .................................................. 710/314
(58) Field of Classification Search .................. 710/22, 710/314
See application file for complete search history.

(56) References Cited

U.S. PATENT DOCUMENTS

| 6,101,563 | A  | * | 8/2000  | Fields et al. ................. 710/104 |
| 6,128,677 | A  | * | 10/2000 | Miller et al. .................. 710/40  |
| 6,209,052 | B1 | * | 3/2001  | Chin et al. ................... 710/109 |
| 6,353,867 | B1 | * | 3/2002  | Qureshi et al. ............. 710/305 |
| 6,370,640 | B1 | * | 4/2002  | Dowling ...................... 712/228 |
| 6,629,157 | B1 | * | 9/2003  | Falardeau et al. ............ 710/10  |
| 6,823,418 | B1 | * | 11/2004 | Langendorf et al. ........ 710/306 |

* cited by examiner

Primary Examiner—Mark H. Rinehart
Assistant Examiner—Christopher Daley
(74) Attorney, Agent, or Firm—Blakely, Sokoloff, Taylor & Zafman LLP

(57) ABSTRACT

In one embodiment, the invention provides a method comprising determining information about an input/output device located north of the memory controller; and controlling a response of the memory controller to read/write requests on a processor bus to a bus agent on a system bus south of the memory controller based on the information.

18 Claims, 4 Drawing Sheets

| Register offset | Register name | Bits required |
|---|---|---|
| 0x04 | Command register | 0 – I/O space enable |
| | | 1 – Memory space enable |
| | | 2 – Bus Master enable |
| | | 5 – VGA palette snoop enable |
| 0x19 | Secondary Bus # | 8 bits |
| 0x1A | Subordinate Bus # | 8 bits |
| 0x1C | I/O Base | 8 bits |
| 0x1D | I/O Limit | 8 bits |
| 0x20 | Memory Base | 16 bits |
| 0x22 | Memory Limit | 16 bits |
| 0x24 | Prefetcheable Memory Base | 16 bits |
| 0x26 | Prefetchable Memory Limit | 16 bits |
| 0x28 | Prefetchable Base Upper 32-bits | 32 bits |
| 0x2C | Prefetchable Limit Upper 32-bits | 32 bits |
| 0x3E | Bridge Control register | 2 – ISA enable |
| | | 3 – VGA enable |

FIGURE 2

CLAIMING CYCLES ON A PROCESSOR BUS IN A SYSTEM HAVING A PCI TO PCI BRIDGE NORTH OF A MEMORY CONTROLLER

FIELD OF THE INVENTION

This invention relates to buses. In particular it relates to the claiming of bus cycles by a memory controller.

BACKGROUND

In a typical system, a memory controller bridges communications between a system bus and a processor bus, and essentially acts as a master response agent (i.e. the target) of processor initiated transactions to read data from I/O devices coupled to the system bus. This works well when all I/O agents are on the system bus, i.e. they are located downstream of the memory controller.

However, some systems exist wherein a I/O agent may be located north or upstream of a memory controller. An example of such a system is a system that integrates an I/O device such as a communications processor into a central processing unit (CPU). With these systems the memory controller is unaware of I/O devices north of it and may therefore incorrectly claim cycles for transactions intended for those I/O devices.

This problem can be overcome by controlling the behavior of the memory controller in software. However, not all operating systems allow this type of control.

BRIEF DESCRIPTION OF THE DRAWINGS

FIG. 2 shows a table of registers that are copied to a memory controller hub in accordance with one embodiment of the invention;

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
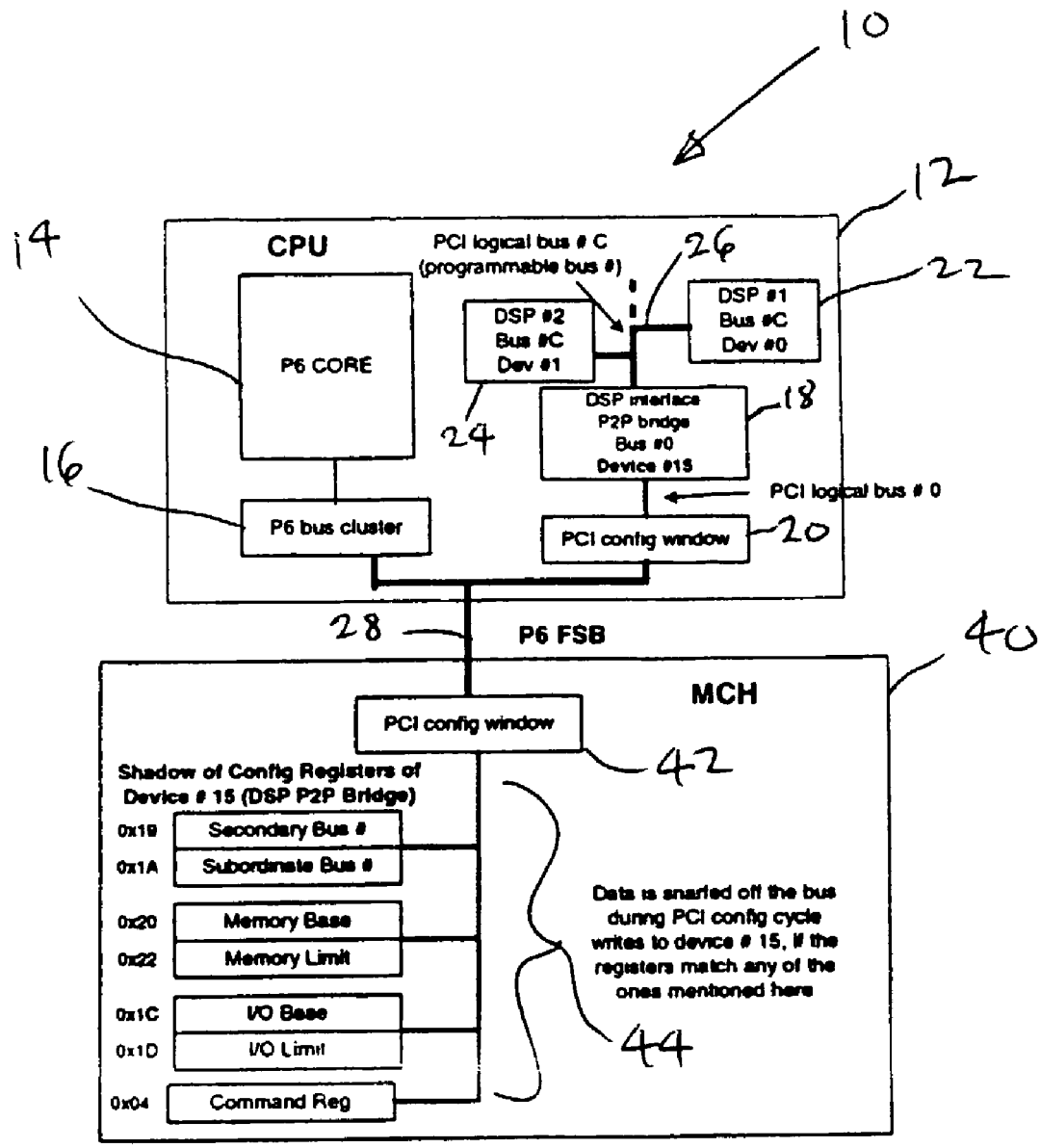
FIG. 1 shows a high level block diagram of a computer architecture within which embodiments of the present invention may be practiced.

FIG. 1 shows a high level block diagram of a computer architecture within which embodiments of the present invention may be practiced. Referring to FIG. 1, it will be seen that the architecture 10 includes a central processing unit or CPU 12 comprising a processor core 14 which is coupled to a front side bus (FSB) 28 via a bus cluster 16. The FSB 28 couples the CPU 12 to a memory controller hub 40. Located within the memory controller hub 40 is a peripheral component interconnect (PCI) configuration window 42 which contains configuration information 44 for a PCI configuration space controlled by the memory controller 40. In use, a number of PCI devices may be connected to the memory controller 40. With standard computer architectures, all input/output devices are normally located south of memory controller 40. Thus, memory controller 40 automatically assumes that it is the responding agent for all memory transactions on the FSB 28, and will accordingly respond by claiming all memory cycles on FSB 28.

However, in some computer architectures an input/output device may be located north or upstream of memory controller hub 40. For example, as can be seen in the architecture 10, input/output devices in the form of digital signal processors (DSPs) are integrated in CPU 12 and are thus located north of memory controller hub 40. Thus, in the case of the architecture 10 the FSB 28 carries memory transactions for devices downstream or south of the memory controller hub 40 as well as for the input/output devices located north of the memory controller hub 40. It would thus be incorrect for the memory controller hub 40 to assume that it is the intended responding agent for all memory transactions on the FSB 28. Therefore, there needs to be some type of mechanism or bus protocol whereby memory transactions intended for devices south of the memory controller hub are claimed by the memory controller hub 40 whereas memory transactions intended for devices north of the memory controller hub are not claimed by the memory controller hub 40.

In accordance with one embodiment of the present invention, the input/output devices north of the memory controller hub 40 are configured as devices on a virtual bridge 18 the configuration parameters of which are stored in a configuration window 20. The virtual bridge 18 controls all input/output devices on a bus 22 which in one embodiment is a PCI compliant bus. In this embodiment, the virtual bridge 18 is thus a PCI-to-PCI bridge. In one configuration, the memory controller hub 40 and the virtual PCI-to-PCI bridge 18 are on logical PCI bus 0. Thus, all input/output devices are located behind the virtual bridge 14.

In order to correctly claim memory cycles, the memory controller hub 40 implements a set of registers known as 'shadow registers' which maintain a copy of some of the important registers for the configuration space of the bridge 18. These registers are then used to determine whether the memory controller hub 40 owns a particular cycle or whether the virtual bridge 18 owns the cycle. The shadow registers are not visible to software, and are updated automatically when software writes to the configuration registers for the virtual bridge 18.

FIG. 2 of the drawings shows a table 50 of the registers for the virtual bridge 18 that are copied or shadowed in the memory controller hub 40, in accordance with one embodiment of the invention.

In order to keep the shadow registers current, the registers are snarfed off the FSB 28 using the device ID of the virtual bridge 18, which is known to the memory controller hub 40. For example, the virtual bridge 18 may have a device ID of # 15 on PCI bus 0. Therefore, a write transaction to any of the registers listed in table 50 targeted towards device #15 on PCI bus 0 are snarfed by the memory controller hub 40 off the FSB 28 and used to update the shadow registers. The intended target of the write which is the virtual bridge 18 is updated as a normal write transaction to its memory space.

In use, the memory controller hub 40 and the virtual bridge 20 determine cycle ownership based on the following rules:

(a) for read cycles that are destined for the communications processing subsystem defined by DSPs 22 and 24, the virtual bridge 18 will drive the data phase signals (D [63:0], DBSY # and DRDY #) such that it is sampled two clocks from when a snoop phase is completed;

(b) the memory controller hub drives the response (RS signals) with identical timing; and (c) if more latency is needed to complete the cycle, the virtual bridge 18 will stretch the cycle by extending the snoop phase with snoop stalls.

Since cycles intended for the communications processing subsystem accesses internal registers, it is not expected that the virtual bridge 20 would have to stretch the cycles under normal conditions. However, in some scenarios it may be necessary to stretch the cycles.

In some embodiments, the protocol of the present invention uses the following rules for write cycles:

(a) for write cycles destined for the communications processing subsystem, the write data cannot be stalled with snoop stalls since the protocol allows request initiated data transfer to occur before snoop phase completion. The virtual bridge 18 is therefore configured to implement write posting buffers and will always be ready to accept data intended for it, once a write cycle is started (ADS # driven) and whenever the memory controller hub 40 is ready to accept a dummy write. The memory controller hub 40 is responsible for driving the TRDY #signal, but can ignore the data; and (b) if the virtual bridge 18 needs to stall any writes it would have to stall the FSB 28 using a BNR # signal. The virtual bridge 28 would initiate a stall when a threshold is reached in its write posting buffers such that any writes beyond the threshold are still accepted.

Figure 3:
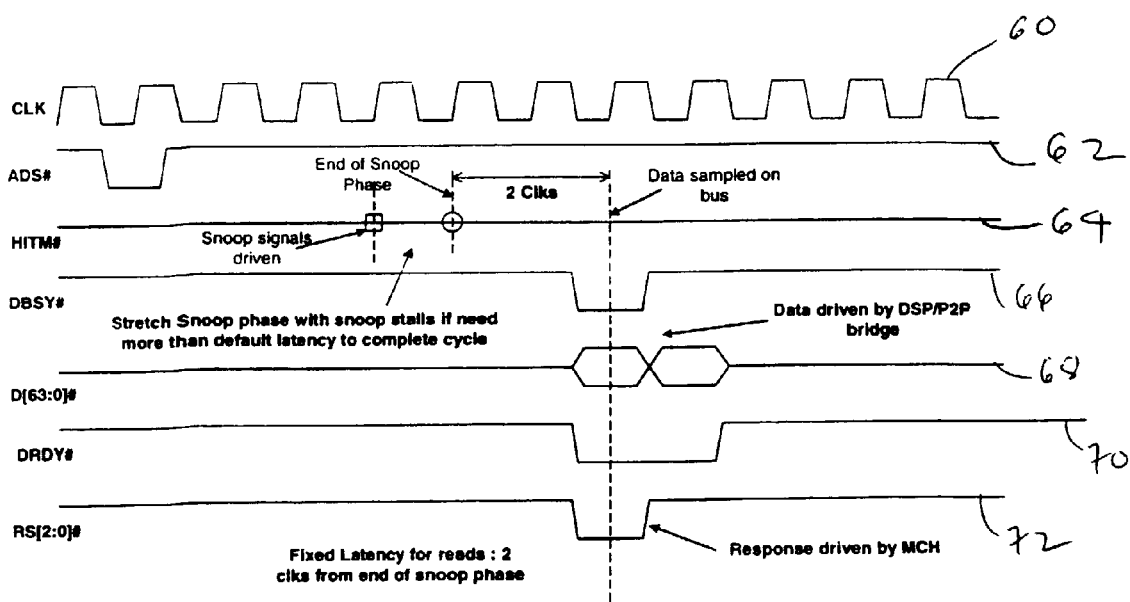
FIG. 3 illustrates a read cycle protocol in accordance with one embodiment of the invention.

FIG. 3 of the drawings illustrates the operation of the read cycle protocol in accordance with one embodiment. Referring to FIG. 3 reference numeral 60 indicates a clock signal which provides a timing reference for the other signals shown in FIG. 2. At the start of the read cycle a signal 62 known as ADS # is generated on the FSB 28. The signal when asserted has a duration of 2 clocks and contains information which response agents use to determine whether a bus transaction should be claimed. A signal 64 known as HITM # is used by snoop agents (i.e., caches) to deliver cache snoop results, or to store the completion of the snoop phase if one or more snoop agents are not ready to deliver a result of the snoop phase.

As can be seen, the read cycle protocol extends the end of the snoop phase with snoop stalls if more than the default latency is required to complete the cycle. This guarantees that the data will be driven exactly within two clock cycles after the end of the snoop phase. A signal 66 known as DBSY # is asserted by a response agent that will drive data on the data bus. A signal 68 known as D [63:0] # is used to transfer data up to a quad word at a time on the data bus. Once the signal 68 is driven, a signal 70 known as DRDY # is asserted by the agent driving the data on the data bus; i.e., the DSPs 22 and 24, to indicate that the data is valid. A signal 72 known as RS [2:0] # is asserted by memory controller hub 40 to deliver the response to the request agent. As will be seen, the read cycle protocol illustrated in FIG. 3 of the drawings guarantees that data in response to a read request will be placed on a data bus exactly 2 clocks from the end of a snoop phase.

Figure 4:
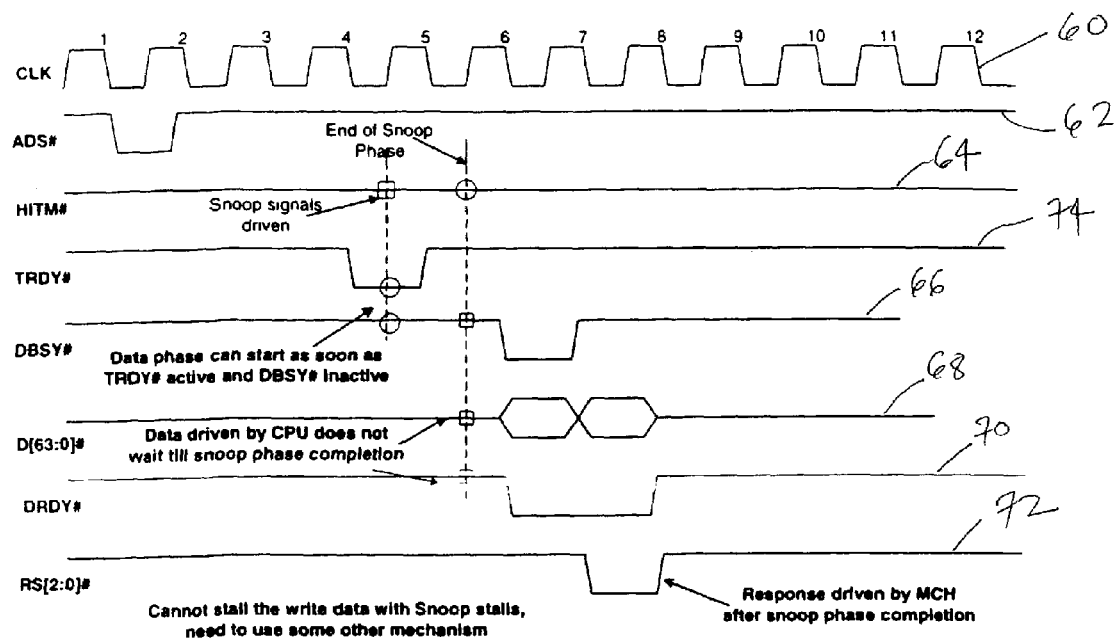
FIG. 4 illustrates a write cycle protocol in accordance with one embodiment of the invention.

FIG. 4 of the drawings illustrates the write cycle protocol in accordance with the invention. In FIG. 4, the same reference numerals have been used to indicate signals already described with reference to FIG. 3 of the drawings. In addition to the signals described in FIG. 3, a signal 74 is generated by the memory controller hub 40 and is known as TRDY #, and is used to indicate that the device to which the data is to be written is ready to accept the data. As will be seen, the data is driven by the CPU as soon as TRDY # is active and DBSY # is inactive. The CPU does not wait until completion of a snoop phase.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
   determining information about a first agent coupled to a processor bus and integrated on a central processing unit, the first agent having registers associated with use of the processor bus;
   replicating the information about the first agent onto a shadow register on a memory controller;
   controlling a response of the memory controller to read/write requests on a processor bus to a bus agent based on the information on the shadow register, and
   automatically updating the shadow register when the registers are written to for a logical peripheral components/interconnect (PCI) bus.

2. The method of claim 1, wherein the first agent comprises a special purpose processor within a CPU.

3. The method of claim 2, wherein the system bus is a peripheral component interconnect (CI) bus.

4. The method of claim 3, wherein the special purpose processor exists as a device coupled to the logical PCI bus within the CPU.

5. The method of claim 4, further comprising:
   replicating configuration information off a processor bus during a PCI configuration cycle, and
   configuring the logical PCI bus.

6. The method of claim 5, wherein the configuration information comprises configuration information stored in the following PCI configuration registers: command register, secondary bus #, subordinate bus #, I/0 base, I/O limit, memory based, memory limit, prefetchable memory limit, prefetchable base upper 32 bits, prefetchable limit upper 32 bits, and bridge control register.

7. The method of claim 6, further comprising configuring the virtual PCI to PCI bridge to drive data in response to a read request onto the processor bus to clock cycles after an end of a snoop phase.

8. The method of claim 7, wherein the virtual PCI-to-PCI bridge is further configured to extend an end of the snoop phase to ensure that the data is driven two clocks after the end of the snoop phase.

9. A system comprising:
a processor bus;
a first agent coupled to the processor bus and integrated on a central processing unit, the first agent having registers associated with use of the processor bus; and
a memory controller coupled to the processor bus, the memory controller having shadow registers that maintain a copy of the information on the registers on the first agent, wherein the shadow registers are updated upon a write command issued for registers for a logical PCI bus.

10. The system of claim 9, wherein the first agent is configured as a device on a logical bus in the central processing nit.

11. The system of claim 9, wherein the first agent is a digital signal processor configured to process communications data.

12. The system of claim 10, wherein the logical bus conforms to the peripheral components/interconnect (PCI) specification.

13. The system of claim 12, further comprising a software defined PCI-to-PCI bridge storing the registers on the first agent for the logical PCI bus and a second agent thereon.

14. The system of claim 13, wherein the memory controller copies the registers from the software defined PCI-to-PCI bridge.

15. The system of claim 14, wherein the memory controller controls its response to an input/output read/write request by using the shadow registers to determine whether the PCI-to-PCI bridge or the memory controller owns a read/write cycle on a processor bus.

16. The system of claim 15, wherein the registers of the software defined PCI-to-PCI bridge comprise the following: command register, secondary, bus #, subordinate bus #, I/O Base, I/O limit, memory base, memory limit, prefetchable memory base, prefetchable memory limit, prefetchable base upper 32 bits, prefetchable limit upper 32 bits, and bridge control register.

17. The system of claim 16, wherein for a read request to a device on the logical PCI bus, data in response to the read request is always driven by the software defined PCI-to-PCI bridge two clock cycles after the end of a snoop phase.

18. The system of claim 17, wherein the software defined PCI-to-PCI bridge is configured to extend the snoop phase so that it is able to drive the data two clock cycles after the end of the snoop phase.

* * * * *